(12) United States Patent
Höglauer et al.

(10) Patent No.: US 12,011,728 B2
(45) Date of Patent: Jun. 18, 2024

(54) BLOWING NOZZLE

(71) Applicant: BRÜCKNER MASCHINENBAU GmbH, Siegsdorf (DE)

(72) Inventors: Christoph Höglauer, Waging am See (DE); Georg Waldleitner, Bad Endorf (DE)

(73) Assignee: BRÜCKNER MASCHINENBAU GmbH, Siegsdorf (DE)

( * ) Notice: Subject to any disclaimer, the term of this patent is extended or adjusted under 35 U.S.C. 154(b) by 586 days.

(21) Appl. No.: 17/329,655

(22) Filed: May 25, 2021

(65) Prior Publication Data
US 2021/0370325 A1    Dec. 2, 2021

(30) Foreign Application Priority Data
May 26, 2020   (DE) .................... 10 2020 114 029.0

(51) Int. Cl.
*B05B 1/24*     (2006.01)
*B05B 1/20*     (2006.01)
*B29C 35/16*    (2006.01)

(52) U.S. Cl.
CPC .............. *B05B 1/205* (2013.01); *B05B 1/24* (2013.01); *B29C 35/16* (2013.01)

(58) Field of Classification Search
CPC .......... B05B 1/205; B05B 1/24; B29C 35/16; B29C 35/045; B29C 55/02; B29C 55/28;
(Continued)

(56) References Cited

U.S. PATENT DOCUMENTS

| | | | |
|---|---|---|---|
| 6,108,939 A | 8/2000 | Kittsteiner et al. | |
| 2015/0099029 A1 | 4/2015 | Handschuh et al. | |
| 2021/0364236 A1* | 11/2021 | Chieda .................. | F26B 13/00 |

FOREIGN PATENT DOCUMENTS

| | | |
|---|---|---|
| CN | 101524892 A | 9/2009 |
| CN | 108367485 A | 8/2018 |

(Continued)

OTHER PUBLICATIONS

Official Communication for Chinese Application No. 202110574880.3, one page, dated Feb. 23, 2023.
(Continued)

*Primary Examiner* — John P McCormack
(74) *Attorney, Agent, or Firm* — Nixon & Vanderhye P.C.

(57) ABSTRACT

The invention relates to an improved blowing nozzle, in particular for stretching systems, which is characterised by the following features, inter alia:

Figure 1:
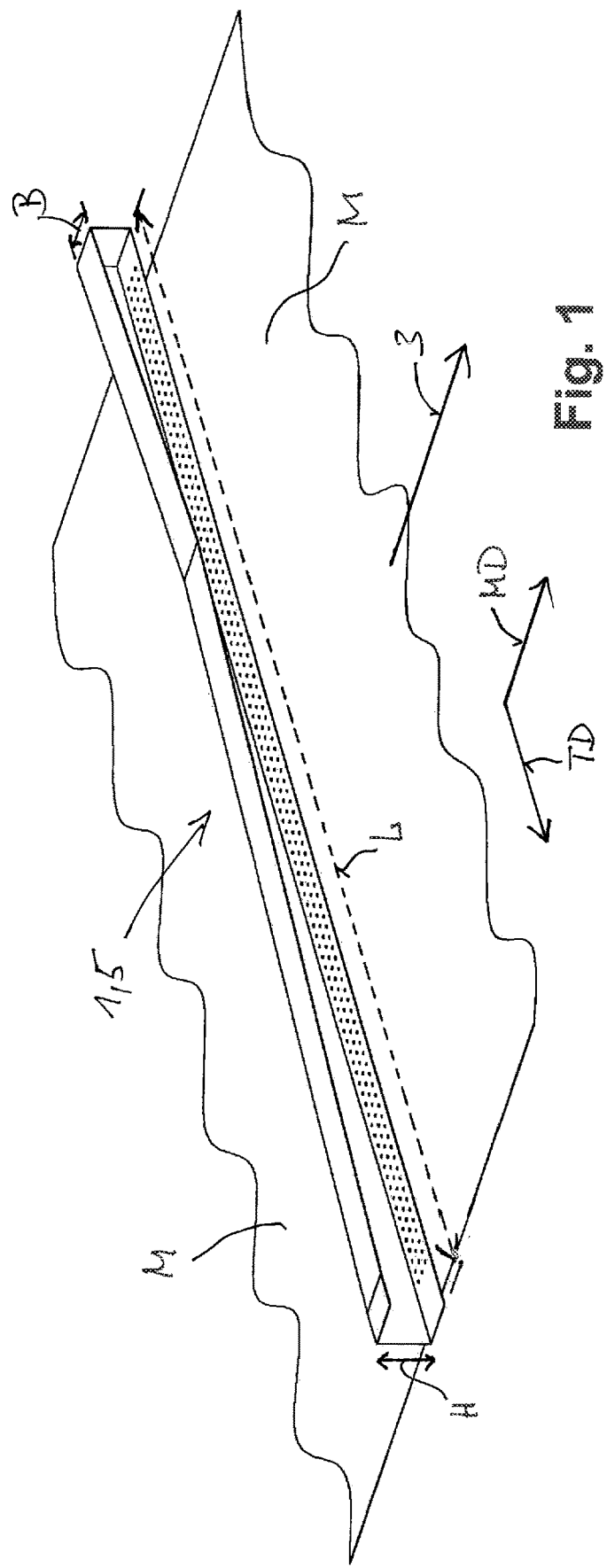

the nozzle box (5) is divided in its longitudinal direction (L) into at least two regions, specifically a first longitudinal region (LB1) closer to the inflow side (7) and a second longitudinal region (LB2) that is subsequent and/or downstream and/or further away from the inflow side (7), the first longitudinal region (LB1) is convergent or comprises at least one convergent portion in which the height (H) between the lower face (11) and the upper face (15) is smaller than the height (H1) in the region of the inflow side (7) as the distance from the inflow side (7) increases, and the second longitudinal region (LB2) is divergent or comprises at least one divergent portion in which the height (H) between the lower face (11) and the upper face (15) is greater than the height (H) at the end of the first longitudinal region (LB1) and/or at the beginning of the second longitudinal region (LB2) as the distance from the inflow side (7) increases.

13 Claims, 5 Drawing Sheets

(58) Field of Classification Search
CPC .......... B29C 2035/1658; B29C 35/002; F04D 29/403; F26B 21/004; F26B 21/006
USPC .......................................................... 34/585
See application file for complete search history.

(56) References Cited

FOREIGN PATENT DOCUMENTS

| | | | |
|---|---|---|---|
| CN | 111002569 A | 4/2020 | |
| DE | 36 26 171 | 4/1987 | |
| DE | 37 04 910 | 10/1987 | |
| DE | 253 666 | 1/1988 | |
| EP | 0 377 311 | 7/1990 | |
| EP | 0 907 476 | 3/2003 | |
| GB | 1498524 A | 1/1978 | |
| TW | 201941897 A | 11/2019 | |
| WO | WO-0186015 A2 * | 11/2001 | ............. B65G 51/03 |

OTHER PUBLICATIONS

Extended European Search Report for Application No. EP 21172925.6, three pages, dated Jan. 7, 2022.

* cited by examiner

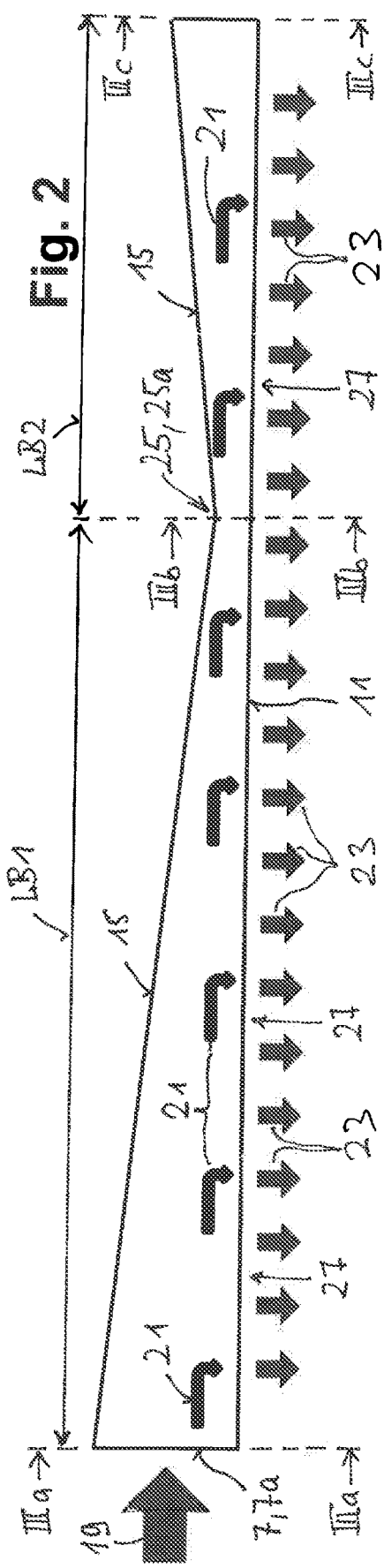
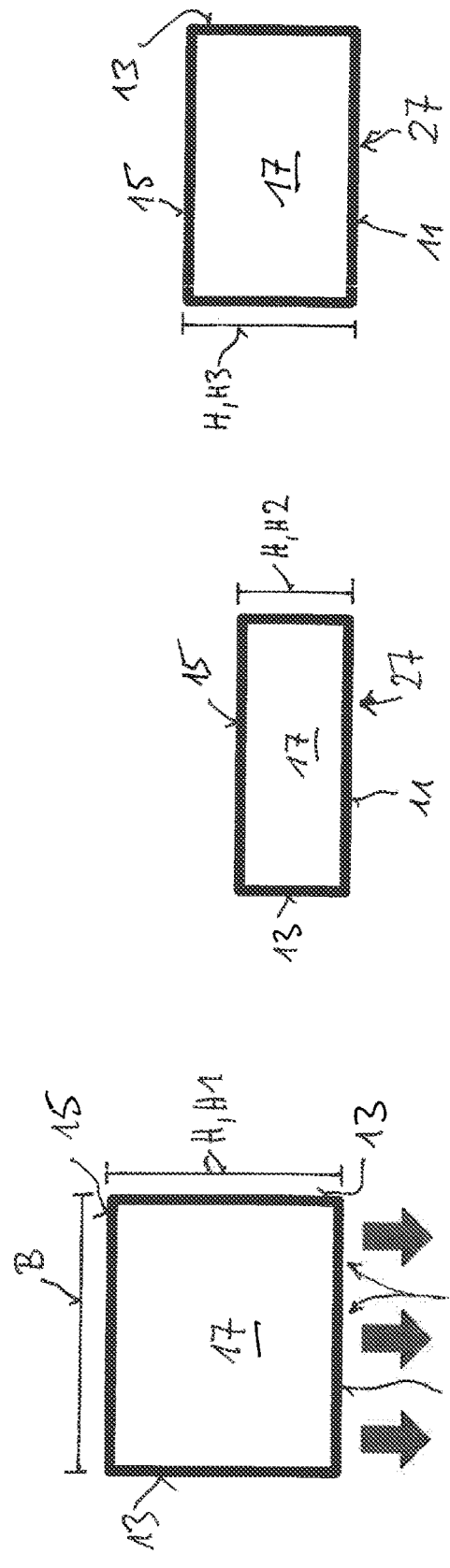
Fig. 2
Fig. 3a
Fig. 3b
Fig. 3c

BLOWING NOZZLE

This application claims priority to DE Patent Application No. 10 2020 114 029.0 filed 26 May 2020, the entire contents of which is hereby incorporated by reference.

The invention relates to a blowing nozzle according to the preamble of claim 1.

Blowing nozzles are used, for example, to heat up or cool down materials in webs, in particular in the production of plastics films. Such ventilation nozzles are arranged transversely, i.e. usually perpendicularly to the withdrawal direction of the material web and thus transversely to the web movement direction above and/or below a material web.

For example, in order to heat or cool a film for a stretching process within a transverse direction orientation (TDO) system to the production-specific temperature, nozzle boxes up to 15 m long having different outflow openings can be used. These nozzle boxes are usually supplied on one side with a used temperature transfer medium, e.g. air, by a pump or fan. Within the nozzle box volume, for example, the air used is distributed over the working width of the nozzle and then flows out in the direction of the material web through the side of the nozzle box facing this material web in the openings. The exiting medium jet strikes the material web and transfers part of its energy to said material web in the form of heat or absorbs heat from the material web in the case of cooling.

One of the major challenges here is to distribute the carrier medium as evenly as possible over the entire working width of the plastics film to be stretched, for example stretched transversely. The reason for this is the direct relationship between product quality and the uniform heating or cooling over the working width of the material web. Ideally, the temperature and the mass flow per outflow opening are identical over the working width.

In order to achieve such an optimal distribution, different blowing nozzles and thus nozzle boxes are proposed.

So-called single-chamber or dual-chamber nozzle boxes are often used. The difference here is that the internal structure of a dual-chamber nozzle divides the internal volume into two regions. The gaseous fluid or gaseous medium, which is preferably supplied from one end of the nozzle box, flows into the nozzle box and is transferred from a first chamber, into which the medium flows, into a subsequent second chamber via intermediate openings or through-openings provided in the nozzle box. From this second chamber, the medium can then be discharged via nozzle openings (which can be shaped differently and can also consist of a single longitudinal slot) in the direction of the material or plastics film web.

In contrast, a single-chamber nozzle has only one volume, i.e. a single inflow and outflow chamber, into which the used gaseous fluid or medium can flow from the inflow opening of said nozzle via a single outlet opening or a plurality of outlet openings oriented in the direction of the material web.

A nozzle arrangement for a material web moved in the longitudinal direction is known from DE 37 04 910 C1 or DE 36 26 171 C1, which nozzle arrangement has only a single chamber which acts as a supply chamber and distribution chamber at the same time. Since the medium used for ventilation is only fed to one end of the nozzle body, this media flow is divided, with part of the media flow in the common supply and distribution chamber first being guided to the opposite end of the nozzle chamber and there being deflected in order to then flow out together with the remaining portion of the supplied gaseous medium in the direction of the material web via the nozzle openings provided in the nozzle box.

A solution which is improved in comparison is known, for example, from EP 0 907 476 B1. The ventilation nozzle known from this prior publication is characterised, among other things, by the fact that it not only has a supply chamber for supplying the ventilation nozzle with treatment gas and, in addition, not only a distribution and outflow chamber via which the treatment gas can flow out in the direction of the material web via the nozzle openings provided, but also that at least one further chamber is also provided between the feed chamber and the outflow and distribution chamber. As a result, the media flow flowing out over the entire width of the material web to be treated is significantly more uniform, with regard to the temperature distribution as well as the volume flow and the current strength via the nozzle arrangement. This has a positive effect on the quality, for example, of the plastics film to be produced and stretched transversely.

Finally, reference should also be made to EP 0 377 311 A1. This prior publication proposes using two channels extending across the width of the film web from an injection side on the end face to the opposite side with a decreasing internal cross section, which channels are oriented in opposite directions. Both channels provided with cross sections which decrease in opposite directions are connected at their lower face to a distribution chamber, via which the gaseous medium can then flow out in the direction of the film.

Proceeding from this prior art, the problem addressed by the present invention is that of providing a blowing nozzle that is as good or improved as possible, but which, in contrast, has a simpler design.

The invention is achieved in accordance with the features specified in claim 1. Advantageous embodiments of the invention are specified in the dependent claims.

The solution according to the invention is based on a single-chamber arrangement. It is all the more surprising that with such a single-chamber arrangement, which up to now has been far inferior to the dual-chamber solution or even the three-chamber solution mentioned above in terms of the technical result, results can actually be achieved that are at least comparable with much more complex and expensive and also heavy nozzle boxes with a two-chamber or three-chamber solution. In other words, it has become possible within the context of the invention to achieve a distribution of the outflowing medium over the nozzle arrangement using the single-chamber solution according to the invention, which distribution is characterised by a high degree of uniformity of the outflow volume over the entire working width of the material web to be treated.

Up to now, the advantage of the dual-chamber nozzles mentioned has been seen, for example, in an improved distribution of the media flow over the working width of the nozzle arrangement that can be achieved by said dual-chamber nozzles, compared with the single-chamber nozzles previously known. However, due to the more complex internal structure, such dual-chamber nozzles are also significantly more expensive and heavier. In addition, an optimal definition of the overflow openings between the first and the second chamber requires a lengthy preliminary design or calculation. In order to ensure sufficient security for this, it is still necessary to implement a test design with the preliminarily defined or calculated nozzle openings and nozzle arrangements in order to truly ensure the desired volume distribution across all nozzle openings. This is usually followed by a subsequent supplementary revision and design or adaptation to achieve a desired optimisation.

Another major disadvantage of the dual-chamber nozzles is the significantly higher total pressure loss, which is caused by the internal structure and the overflow openings in the nozzle box and thus increases the ongoing energy costs for supply (supplying the required pumps and/or the required fans).

Finally, it must also be noted that such dual-chamber nozzles also have a disadvantage with regard to the associated maintenance and internal cleaning. Due to the multi-chamber design, the internal structure of the nozzles is partly built in such a way that the internal structure is only accessible for carrying out maintenance or internal cleaning to a very limited extent, or not at all.

It is all the more surprising that, within the context of the invention, such an improvement is also possible with comparatively simple means in the case of a single-chamber nozzle.

In the context of the invention, in a preferred embodiment, it is also possible that, for example, the hole field in which the outlet nozzles for the gaseous medium are formed can have a hole construction that starts from a constant hole diameter. In other words, within the context of the invention, constant outlet openings or constant repeating hole patterns over the entire length of the nozzle box, i.e. over the entire working width extending over the width of the material web, are possible, specifically for nozzle boxes of different sizes and lengths that can be used for film webs of different lengths, for example, in stretching systems. This offers an important advantage, since otherwise, with different designs of the hole sizes and/or hole patterns and also different designs over the length of the nozzle box, new preliminary designs and/or calculations would have to be carried out for each individual application in order to achieve an optimal distribution of the media flow. In other words, in the single-chamber solution according to the invention, a significant improvement in terms of the media flow across the working width can be ensured. In this case, even the cross-sectional shape can be kept very simple, specifically it can ultimately be, for example, rectangular over the entire length of the nozzle box.

To put it simply, the solution according to the invention can be implemented in that the blowing nozzle according to the invention, and thus the nozzle box according to the invention, comprises over its length a convergent region closer to the inlet opening of the gaseous fluid and an adjoining and/or subsequent divergent region. The nozzle box can be formed, for example, in that, in the convergent region, the upper face of the nozzle box slowly approaches the lower face of the nozzle box while reducing the box cross section, and from a certain transition point or a kink or kink point it is designed to converge again, i.e. to extend away.

It is sufficient within the context of the invention if both in the convergent nozzle box region or nozzle box portion and in the adjoining divergent nozzle box region or portion, optionally, convergent or divergent portions are only actually formed in a partial length, optionally a plurality of times in succession.

In summary, the most important advantages of the single-chamber nozzle according to the invention can be described as follows:
  there is a massive reduction in the scatter of the gaseous media flow across the working width of the blowing nozzle, even with large working widths;
  compared to previously known dual-chamber or tri-chamber nozzles, the single-chamber nozzle according to the invention is characterised by a low manufacturing cost;
  the single-chamber nozzle according to the invention can be manufactured in a significantly more cost-effective manner than comparable solutions according to the prior art and, above all, also has a significantly lower weight than conventional dual-chamber or tri-chamber nozzles;
  the single-chamber nozzle according to the invention causes a significantly lower pressure loss than the dual-chamber nozzle; and
  the interior of the single-chamber nozzle is much more easily accessible, in particular also for interior cleaning, compared with the previously known dual-chamber or tri-chamber nozzles.

Figure 4:
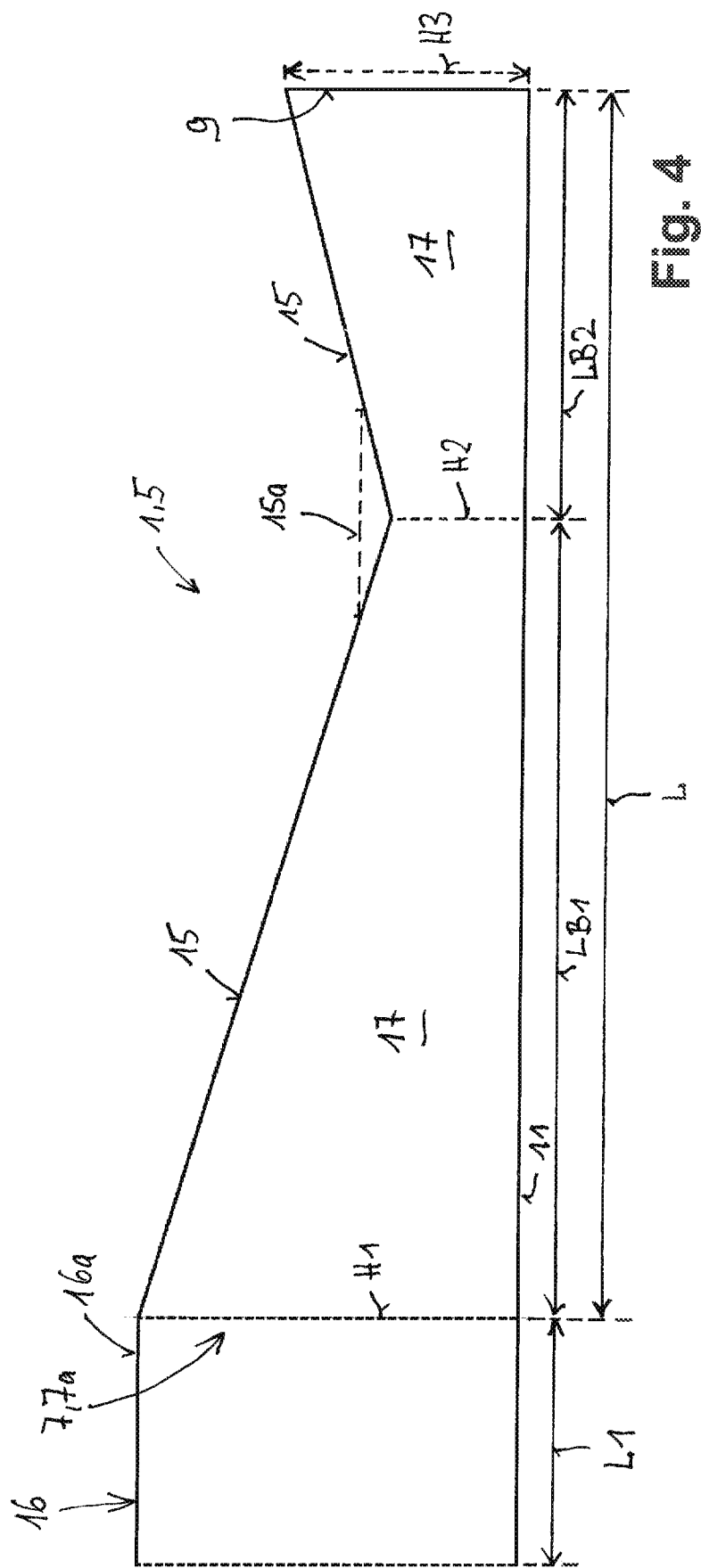

The invention will be explained in more detail hereinafter with reference to drawings, which show, in detail:

FIG. 1: a schematic overall view of the blowing nozzle according to the invention;

FIG. 2: a schematic side view of the blowing nozzle according to the invention;

FIG. 3a: a schematic cross-sectional view of the blowing nozzle shown in FIG. 2 along the line IIIa-IIIa;

FIG. 3b: a schematic cross-sectional view along the line IIIb-IIIb;

FIG. 3c: a cross-sectional view through the blowing nozzle shown in FIG. 2 along the line IIIc-IIIc;

FIG. 4: a further schematic cross-sectional view of the blowing nozzle according to the invention;

FIGS. 5a to 5g: seven examples shown in detail for different ventilation nozzle geometries; and

FIG. 6: a diagram.

Hereinafter, FIG. 1 will first be discussed, in which the blowing nozzle 1 according to the invention is shown in a schematic three-dimensional representation.

It can be seen from FIG. 1 that the blowing nozzle 1 mentioned is arranged, for example, above a moving material web M, which is moved in the direction of arrow 3 in the withdrawal direction. The material web M is, for example, a plastics film that is stretched in a stretching system. The stretching system can be a transverse direction orientation system, a longitudinal stretching system or, for example, a sequential stretching system with a longitudinal and a transverse stretching stage or even a simultaneous stretching system.

The blowing nozzle shown in FIG. 1 is usually not only arranged on one side of the material web M moved underneath, but preferably symmetrically on both sides, i.e. above and below the material web M at the mentioned, preferably small distance. In this respect, the blowing nozzle is also referred to as a nozzle box 5, which has a longitudinal extent L, a width B and a height H—which will be discussed in greater detail later—which changes at least in portions in the longitudinal direction L of the nozzle box 5.

The nozzle box 5 mentioned is usually arranged transversely to the web of material M moved underneath, i.e. usually perpendicularly thereto. The longitudinal direction L of the nozzle box 1 therefore extends in the transverse direction to the moving material web M, in a stretching system that is therefore in the transverse direction of the stretching system (TDO). If the nozzle box is arranged perpendicularly to the withdrawal direction, then the width of the nozzle box extends in parallel with the withdrawal direction 3. The height is then oriented so as to be perpendicular to the plane E of the material web. FIG. 1 also shows schematically the machine longitudinal direction MD of a stretching system and the machine transverse direction TD extending perpendicularly thereto in the width direction of the material web M. In other words, a corresponding blowing nozzle 1 or nozzle box 5 is thus arranged above and/or below a moving material web M to be treated, perpendicularly to the longitudinal movement direction of the film (MD direction) and thus in parallel with the transverse direction or transverse movement direction of the film (TD direction).

FIG. 1 only shows the material web M itself in part.

Hereinafter, FIG. 2 and FIGS. 3a to 3c will be discussed.

FIG. 2 shows, in a schematic side view, the blowing nozzle 1 according to the invention as shown in FIG. 1, but in a "compressed" representation, whereby the change in height over the length L of the blowing nozzle is clearer.

The blowing nozzle 1, and thus the nozzle box 5, is usually supplied on one side with a temperature transfer medium, e.g. air by means of a pump and/or a fan. Hereinafter, a medium or fluid is also referred to in general terms, i.e. ultimately a gaseous medium or fluid that can be heated or cooled to a corresponding temperature, depending on whether the medium flowing out of the nozzle box in the direction of the material web M is to be used to heat or cool the material web M.

The blowing nozzle 1 or the nozzle box 5 therefore has an inflow side 7 which is therefore provided with a corresponding inlet or inflow opening 7a. This inlet or inflow opening 7a or the corresponding inflow side 7 of the nozzle box 5 is sometimes also referred to as the inflow-side end face 7 or the end-face inlet or inflow opening 7a.

In this respect, the side or end face of the nozzle box that is remote from or opposite thereto is then also referred to as the closure side 9.

The nozzle box 5 is or can have a substantially rectangular cross-sectional shape. The nozzle box 5 has a lower face 11 which, when the blowing nozzle 1 is mounted, is oriented in the direction of the material web M so as to be adjacent to a material web M moved past it and which, as mentioned, is arranged at a preferably small distance from the material web M.

The lower face 11 or the nozzle box 5 as a whole has a width B which preferably remains or can remain unchanged (but does not have to remain the same) over the entire length L of the nozzle box, at least as far as the width of the outflow openings located therein or the regions of the outflow openings located therein are concerned.

As can be seen in principle from FIGS. 3a to 3c, the nozzle box further comprises two lateral walls 13 which are offset in the width direction and thus in the withdrawal direction 3 and which can be arranged at the distance B when oriented so as to be perpendicular to the lower face.

The upper face 15 is provided at a distance from the lower face 11 and extends between the two lateral walls 13 opposite the lower face 11. In its simplest form, the nozzle box 5, which is preferably rectangular in cross section, is thus formed, which thus has only a single chamber 17 over its entire length L. In this respect, it is also sometimes referred to as a "single-chamber nozzle".

In the schematic side view according to FIG. 2, it can be seen that, for example, the mentioned temperature transfer medium or generally the fluid or medium flows in via the inflow side 7 and the inflow opening 7a provided there, as shown by the arrow 19. Corresponding to the further arrows 21, the gaseous temperature carrier medium flows in the interior of the nozzle box 5 (i.e. in the chamber 17) partially up to the closure side 9 thereof opposite the inflow opening. In this way, a partial medium flow always flows downwards in accordance with the arrows 21 through the outlet openings of an outlet opening arrangement or device 27 provided in the lower face 11 of the nozzle box 5. The flow takes place, according to the arrows 23 in FIG. 2, in the direction of a material web that is moved directly in parallel with the lower face 11 of the nozzle box and thus perpendicularly to the plane of the drawing (as shown in principle on the basis of FIG. 1).

As can also be seen from the cross-sectional view according to FIG. 2, the upper face 15 of the nozzle box 5 does not extend, however, in parallel with the lower face, such that the cross-sectional size would remain unchanged over the length L of the nozzle box, but has at least two longitudinal regions, specifically a longitudinal region LB1 and a longitudinal region LB2 having a changed height.

In the longitudinal region LB1 closer to the inflow side 7, starting from the inflow side or closer to the inflow side, a region is formed in which the height H of the nozzle box decreases at least in portions. In the embodiment shown, this inflow-side longitudinal region LB1 is designed to be converging, i.e. in such a way that the height H of the nozzle box 5 decreases, specifically over the entire length of the first longitudinal region LB1 in the embodiment shown. In this respect, it is also referred to as a convergent longitudinal region LB1.

In FIG. 2, the design is such that the height decreases, preferably decreases continuously as shown, from the inflow side 7 up to a turning point or a turning region, which can subsequently also be designed in the form of a turning edge 25. The input-side height H1 (which is the maximum height of the nozzle box) is greater than the height H2 at the mentioned turning point or the turning edge 25 at the end of the first longitudinal region LB1.

Proceeding from this turning point 25, the first longitudinal region LB1 is followed by the longitudinal region LB2, which is further away from the inflow side and is designed to diverge from the first longitudinal region LB1. In other words, the height H of the nozzle box increases in the region between the turning point 25 or the turning region 25 and the closure side 9, such that the height H at the end of the nozzle box is again greater than at the turning point or the turning region 25. In this respect, it is also referred to as a divergent longitudinal region LB2.

It can also be seen from the schematic view according to FIG. 2 that the height H3 of the nozzle box 5 on its closure side 9 is greater than at the turning point or the turning region 25 (i.e. at the beginning of the divergent longitudinal region LB2), but smaller than the height H1 of the nozzle box 5 on its inflow side 7.

Such a configuration of the nozzle box results in cross sections as shown in FIGS. 3a, 3b and 3c. The cross-sectional shape according to FIG. 3a corresponds to the cross section at the inflow opening 7, i.e. the inflow side 7. The cross-sectional shape 3b is the shape at the turning point or the turning region or at the turning edge 25 (or generally a transition region 25a). The cross-sectional shape 3c corresponds to the cross section of the nozzle box in the region of the closure side 9. As mentioned, the height H1 on the inflow side is greater than the height H3 on the closure side 9 and this height H3 on the closure side 9 is in turn greater than the height H2 at the turning point, the turning region or the turning edge 25.

FIG. 4 shows, similar to FIG. 2, the geometry of the nozzle box according to the invention, also in a quasi "compressed" representation, whereby the slope of the upper face 15 of the nozzle box in the convergent longitudinal region LB1 nevertheless corresponds to a very large extent to the rise of the upper face 15 of the nozzle box 5 in the downstream second divergent longitudinal region LB2. Good results can be achieved within the context of the invention if, for example, the inflow-side converging longitudinal region LB1 extends over at least 55%, i.e. in particular at least 60%, 65%, 70%, 75% or 80% of the total length L of the nozzle box or thus the entire width of the material web M to be treated.

In other words, the second and divergent longitudinal region LB2, which is remote on the inflow side, should extend over at least 5%, 10%, 15%, 20%, 30%, 35% or 40% of the total length L of the nozzle box 5 or the width of the material web M to be treated.

It should also be noted that the height H3 on the closure side 9 at the end of the nozzle box 5, based on the inflow-side height H1, has a relative size that is preferably less than 90%, in particular less than 95%, 80%, 75%, 70%, 65%, 60%, 55%, 50%, 45% or less than 40% of the input-side size H1. However, this height H3 on the closure side should preferably be greater than 20%, in particular 25%, 30%, 35%, 40%, 45%, 50%, 55%, 60%, 65% or greater than 70% of the height H1 of the nozzle box on the input side.

The smallest height of the nozzle box according to the invention in the region between the converging and the diverging region of the nozzle box, i.e. the height H2, should preferably have a value that is at least 5%, in particular 10%, 15%, 20%, 25%, 30%, 35%, 40%, 45%, 50%, 55%, 60%, 65% or 70% smaller than the height H3 on the closure side.

In other words, this smallest height H2 should have a value which, based on the height H1 on the input side, is preferably less than 75%, in particular less than 70%, 65%, 60%, 55%, 50%, 45%, 40%, 35%, 30%, 25% or 20%.

It should also be noted that, for example, in the first so-called convergent longitudinal region LB1, the upper face 15 of the nozzle box 5, unlike the embodiment shown, does not have to extend continuously on the lower face 11 from the inflow side 7 up to the turning point or the turning region or turning edge 25. It is also possible that this converging configuration can optionally only be designed for a sub-portion, i.e. a partial length in this first longitudinal region LB1; in other words, the upper face 15 of the nozzle box 5 can comprise at least portions in which this upper face 15 can also extend, for example, in parallel with or at a different angle of inclination to the lower face than in the remaining converging portion. In other words, in this case the upper face 15 of the nozzle box tapering in a wedge shape towards the lower face 11 would only have this course in a sub-region, i.e. a partial length of the first longitudinal region LB1.

The same also applies to the diverging longitudinal region LB2. Here, too, the upper face 15 of the nozzle box does not have to extend in a divergent manner continuously from the turning point or the turning region or the turning edge 25 to the closure side 9, but can also have portions here that extend, for example, at a different angle of inclination or are even oriented so as to be parallel to the lower face 11.

In referring to a convergent region LB1, this is intended to express the fact that a continuous convergent portion can be provided in this longitudinal region, as is shown with the aid of FIG. 2. Nevertheless, a plurality of convergent and successive portions can also be formed here, which are separated from one another by one or more portions, for example, which have an upper face 15 extending in parallel with the lower face 11, in the extreme case perhaps even at least short portions in which the predominantly convergent region LB1 comprises an intermediate portion which has a diverging course of the upper face.

The subsequent second longitudinal region LB2 can therefore e.g. not only be characterised by a continuously divergent design, but can, for example, also have two or more individually divergent longitudinal region portions, between which, for example, a portion is formed which has an upper face 15 which extends in parallel with the lower face 11. Likewise, an at least short, in the extreme case, divergent intermediate portion for the upper face 15 of the nozzle box 5 can also be formed between the predominantly divergent portions. In other words, in this case the upper face 15 of the nozzle box, which extends away from the lower face 11 in a wedge shape, would only have this course in a sub-region, i.e. a partial length of the second longitudinal region LB2.

It should also be noted that both in the convergent longitudinal region LB1 and in the divergent longitudinal region LB2, the shape of inclination and/or the angle of inclination of the upper face with respect to the lower face of the nozzle box need not be identical (i.e. always extending at the same angle as shown in the drawing according to FIG. 2). It is also possible that this region can have portions in which these angular orientations of the upper face undergo certain changes in relation to the orientation of the lower face.

Finally, it should also be noted that the turning point or turning region or turning edge 25 shown does not have to be designed in the form of a real kink or edge, but that this turning point or this turning region or this turning edge 25 can also be designed as a longitudinal region that extends at least over a certain extent in the longitudinal direction L of the nozzle box. In this case, the upper face 15 can extend, for example, in parallel with the lower face 11 in this region. This transition region 15a which, for example, extends in parallel with the lower face 11 is shown in broken lines in the drawing. The first longitudinal region LB1 and the second longitudinal region LB2 are thus somewhat shorter since the entire length of the nozzle box is formed by the sum of the first longitudinal region LB1 and the second longitudinal region LB2 plus the length of the transition region 15a.

As mentioned, the lower face 11 of the blowing nozzle 1, and thus of the nozzle box 5, is provided with at least one or more outlet openings 27 for the gaseous medium flowing out here.

On the basis of FIGS. 5a to 5f, different options for exhaust openings 27 are shown here, which can be formed on the lower face of the nozzle box 5.

In FIG. 4, on the left-hand side in front of the actual inflow side 7 of the nozzle box 5, a front box 16 is also shown, which has a non-sloping upper face in its overall length L1, i.e. an upper face 16a that extends in parallel with the bottom 11. Its lateral walls are generally provided to extend as an extension of the actual lateral walls 13 of the actual nozzle box 5, i.e. in alignment with said lateral walls 13. Such a front box can serve for additional anchoring in the side region of the stretching system and/or for the improved supply of a gaseous fluid, this so-called front box being provided in its length L1 laterally to the actual material web, and no outlet openings are usually formed on the lower or bottom face 11. A similar nozzle box extension could also be provided following the closure side 9 on the opposite side of the nozzle box. The above-mentioned front box 16 is only optional and not absolutely necessary for the invention.

In FIGS. 5a to 5g, the variants shown are represented in a bottom view of the nozzle box, which extends in the longitudinal direction L according to the arrow, although only a comparatively short portion of the lower face view is shown schematically from this longitudinal extent.

The exhaust opening arrangement or device 27 is generally designed in such a way that the openings are arranged in a region on the lower face 11 which is somewhat narrower and more central than the width of the lower face 11 itself.

Figure 5:
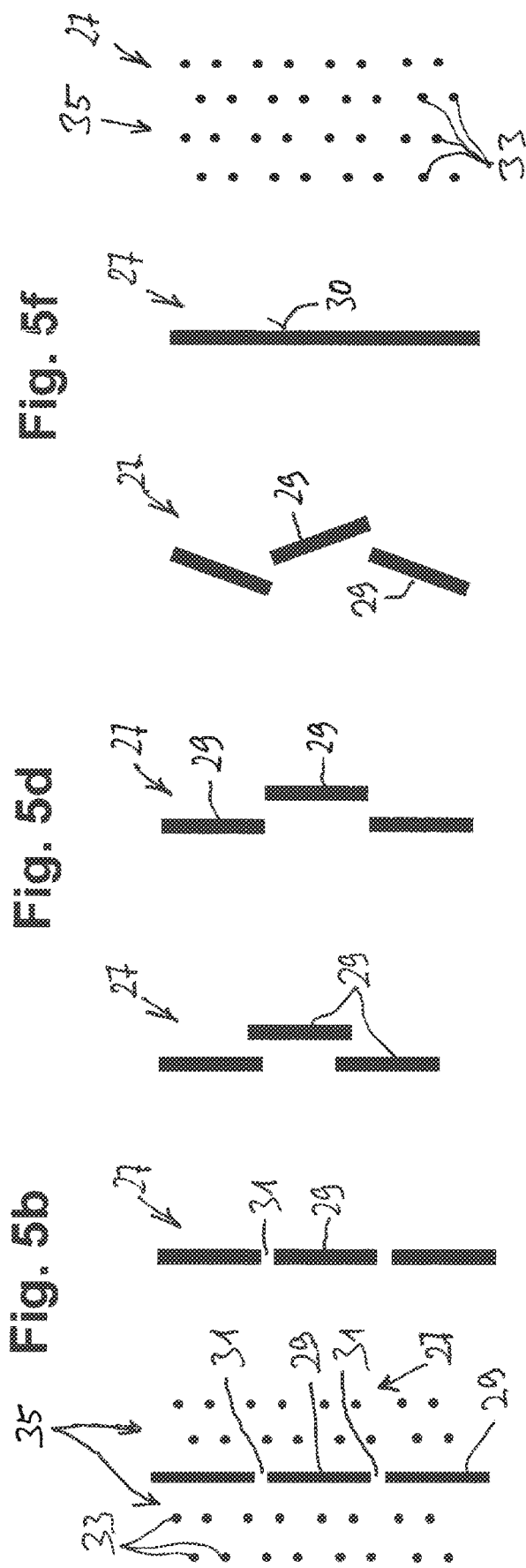

In the variant according to FIG. 5a, e.g. a plurality of elongate holes 29 are provided which extend in the longitudinal direction L, are separated from one another by comparatively shorter connecting webs 31 in the lower face 11 of the nozzle box 5 and lie in an axial longitudinal extension direction. Spaced apart on both sides, a large number of individual exit holes 33 are formed in a plurality of rows and possibly optionally slightly offset from one another, which result in an entire hole field 35.

In the variant according to FIG. 5b, elongate holes 29 are formed in the lower face 11, which lie one after the other in a longitudinal extension direction and are separated from one another by the aforementioned connecting webs 31 in the lower face 11. If no additional exit holes 33 are provided, as in the variant according to FIG. 5a, the width of the elongate holes should be selected so as to be larger than in the embodiment according to FIG. 5a.

In the variant according to FIG. 5c, elongate holes 29 formed at a distance from one another are provided in two rows arranged so as to be adjacent to one another and extending in the longitudinal direction L. The arrangement is preferably such that these elongate holes overlap in a side view.

In the variant according to FIG. 5d, in contrast to FIG. 5c, the elongate holes are provided in a non-overlapping manner, i.e. only offset in two rows such that the elongate holes do not overlap when viewed from the side. That is to say, to the side of an elongate hole 29 in a row, the remaining portion of the lower face 11 of the nozzle box is closed, an elongate hole 29 in a row only being formed where no elongate hole 29 is provided in the adjacent row of elongate holes.

In the design according to FIG. 5e, the elongate hole field is designed such that the elongate holes 29 provided in the longitudinal direction L of the nozzle box are each oriented at an angle to one another. For this purpose, for example, all consecutive even-numbered elongate holes are oriented with an angle of attack to the right-hand side and all holes located in between are oriented with an angle of attack in the opposite direction.

FIG. 5f shows that, for example, the exhaust opening arrangement 27 can also be formed by a continuous slot 30 in the form of an elongate hole. In such a configuration, additional hole fields 35, e.g. comprising a large number of individual openings 33, can be provided to the left-hand side and right-hand side of the slot, similar to FIG. 5a.

In general, it should be noted that the hole geometry for the exhaust openings is actually not subject to any restrictions and can be any geometry, even from combinations of the variants shown only by way of example. For example, in addition to round outflow openings or nozzle openings, further geometric shapes of the opening can also be used in the described convergent-divergent single-chamber nozzle. This includes geometric shapes as just described in part and shown in the form of one or more slots, round holes, shaped openings such as elongate holes or oval holes, with parallel or offset or inclined elongate holes or also in the form of combinations of these variants.

The exhaust opening arrangement can thus, as mentioned, comprise holes 33 and/or slots 29 and/or generally hole fields 35, which have either a constant or evenly repeating geometry and/or shape and/or size with regard to the nozzle outlet openings over the length of the nozzle box and/or at least over the width of the material web. However, it is also possible that a constant geometry is not provided over the length of the nozzle box. For example, the exhaust opening arrangement can have holes, slots or other through openings which change in shape and in diameter and/or size over the length of the nozzle box or at least in portions over the length of the nozzle box. There are no fundamental restrictions in this respect either.

It should also be noted that the exhaust nozzle arrangement 27 can be selected according to the length and/or width of the nozzle box 5. Ideally, the exhaust nozzle arrangement 27 is provided in the nozzle box, extending at least in such a length (and therefore transversely or perpendicularly to the withdrawal direction of the material web) that corresponds to the width of the material web. This allows a media flow to be generated over the entire width of the material web.

Finally, it should also be mentioned in this context that the outlet opening arrangement 27 or the outlet openings need not be designed in such a way that the temperature carrier medium or temperature carrier fluid flowing out of the nozzle box can only flow out perpendicularly to the material web M that is passed by at a distance, but that the exhaust openings can also be designed such that the medium flowing out can, for example, flow at an angle other than 90° onto the plane E of the material web M (for example at an angle of 85°, 80°, 75°, 70°, 65°, 60° etc.—any intermediate values between the stated values are also possible, i.e. for example generally in a range between 90° and 60° and any partial value).

In other words, it is possible to adjust the particular opening with the aim of inclining the exiting free jet. Reasons for choosing other outlet shapes or inclinations of the jet and thus the so-called angle of impact can be to increase the free jet stability and to change the heat transfer in the material webs.

The solution according to the invention, with the formation of at least one convergent longitudinal region LB1 closer to the inflow side 7 and a subsequent divergent longitudinal region LB2 that is further away from the inflow side 7, is ultimately advantageous due to the desired, approximately equal flow speed in the entire nozzle box and thus also contributes to the equal static internal pressure over the entire length of the nozzle box. As a result, the momentum change of the deflection and outflow from the nozzle box 5 over the length L thereof remain similar. Another advantage of this solution according to the invention is, accordingly, the vortex system that occurs downstream of the turning point, the turning region or turning edge, which, among other things, prevents a stagnation point at the nozzle end together with a resulting oversupply of the last (i.e. furthest from the inflow side 7) exhaust openings. The combination of these effects induced by the geometry result in a significant improvement in the distribution over the nozzle box lengths of up to 70% compared to simple cuboid single-chamber nozzles.

Figure 6:
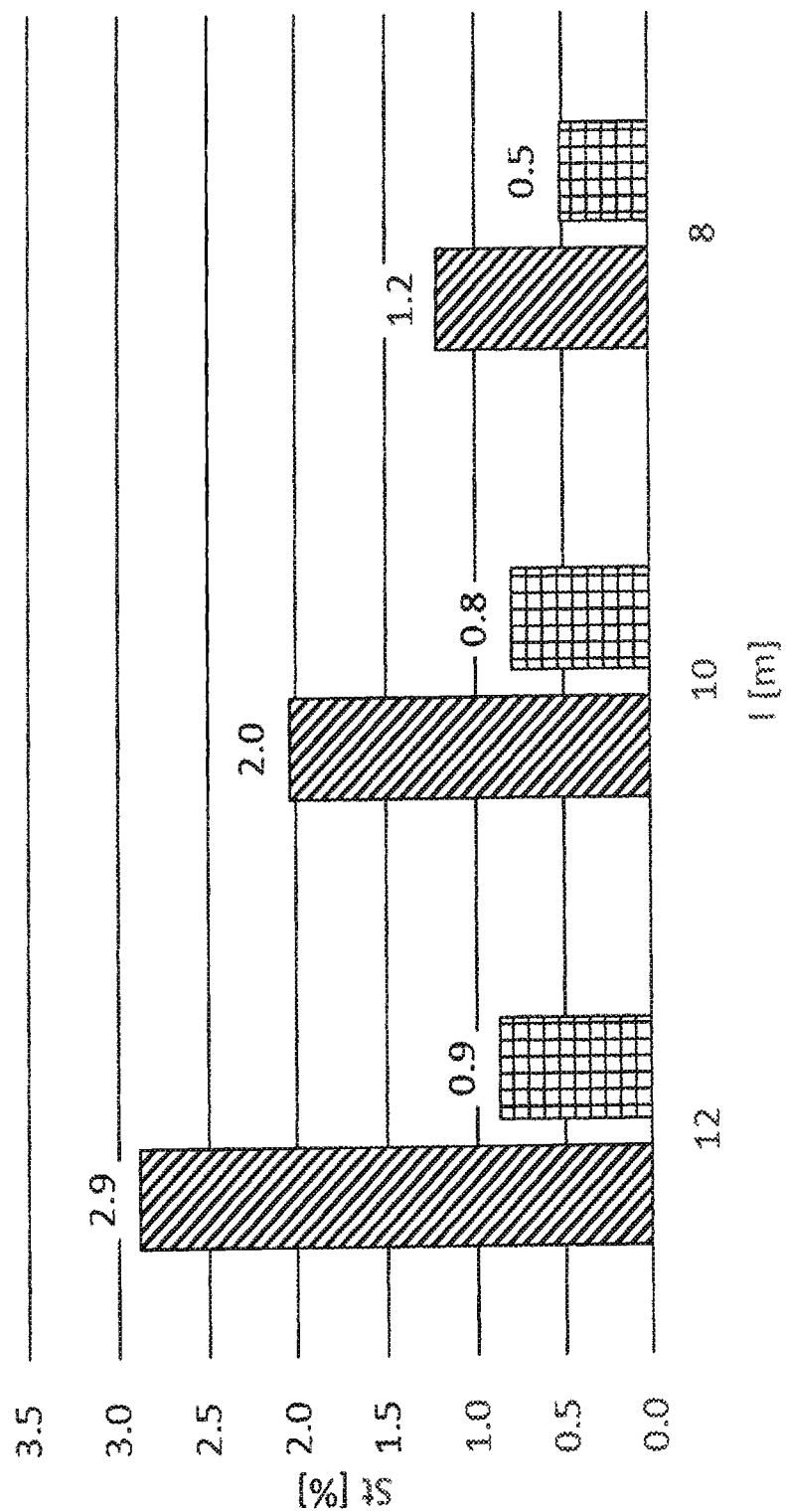

In order to clarify the advantages according to the invention compared to a standard single-chamber nozzle box solution, which in the prior art has the same cross-sectional size over the entire length, reference is made to FIG. 6. FIG. 6 shows a comparison of the scatter St (mass flow per outlet opening) over all holes of the nozzle box 5 of a rectangular single-chamber nozzle and the convergent-divergent single-chamber nozzle according to the invention (based on the length L of the nozzle box in meters m). The taller diagram bars correspond to the relationships in the case of a right-angled single-chamber nozzle and the diagram bars shown on the right-hand side reflect the relationships in a convergent-divergent single-chamber nozzle according to the invention, in each case based on the different nozzle box lengths indicated on the X-axis. Even with an 8 m long blowing nozzle 1, for example, a maximum desired scatter of the gaseous temperature carrier medium of ±1.5% is almost achieved with the simply designed rectangular single-chamber nozzle. With the longer nozzle lengths, the maximum desired scatter is exceeded and until now it had to be switched to the dual-chamber nozzle.

The simulation of the convergent-divergent blowing nozzle 1 shows a massive reduction in the scatter with regard to the gaseous fluid flow over the working width and can thus replace the dual-chamber nozzle according to the prior art with regard to the scatter criterion.

Another advantage of the convergent-divergent single-chamber nozzle is that the total pressure loss is only slightly higher compared to the simple single-chamber nozzle according to the prior art. The following table 1 shows an example of the numerically calculated change in the total pressure loss of these two nozzle boxes with three different volume flows and round outlet holes:

TABLE 1

|  | Test case 1 | Test case 0 | Test case 2 |
| --- | --- | --- | --- |
| $\dot{V}/\dot{V}_0$ | 50% | 100% | 150% |
| $\Delta p_{tot}/\Delta p_{0,\,tot}$ | 106% | 100% | 105% |

The invention claimed is:

1. Blowing nozzle for stretching systems, comprising the following features
   the blowing nozzle comprises a nozzle box,
   the nozzle box has a lower face, two lateral walls which extend so as to be laterally spaced apart, and an upper face, whereby the nozzle box is formed having a chamber delimited by the lower face, the lateral walls and the upper face,
   the nozzle box has a total length,
   the nozzle box has an inflow side at one of the end regions thereof in relation to its total length and a closure side on the opposite side thereof,
   an exhaust opening arrangement is provided on the lower face so that a temperature transfer medium flowing in via the inflow side can flow into the nozzle box and flow out via the exhaust opening arrangement,
characterised by the following further features
   the nozzle box is divided in its longitudinal direction into at least two regions, specifically a first longitudinal region closer to the inflow side and a second longitudinal region that is subsequent and/or downstream and/or further away from the inflow side,
   the first longitudinal region is convergent or comprises at least one convergent portion in which the height between the lower face and the upper face is smaller than the height in the region of the inflow side as the distance from the inflow side increases, and
   the second longitudinal region is divergent or comprises at least one divergent portion in which the height between the lower face and the upper face is greater than the height at the end of the first longitudinal region and/or at the beginning of the second longitudinal region as the distance from the inflow side increases.

2. Blowing nozzle according to claim 1, wherein a turning point, a turning region or turning edge is formed between the first or downstream longitudinal region and the subsequent second longitudinal region.

3. Blowing nozzle according to claim 2, wherein the turning point or the turning region or the turning edge is in the form of an edge which extends between the two lateral walls, is formed in the upper face and on which the upper face, which is inclined towards on the lower face in the first longitudinal region, transitions into the upper face which extends away at an angle from the lower face in the second longitudinal region, an angle being formed between the plane of the upper face in the first longitudinal region and the plane of the upper face in the second longitudinal region in relation to one another, which angle is smaller than 179° smaller than 178°, 177°, 176° or smaller than 175°, and/or is greater than 155°, 156°, 157°, 158°, 159°, 160°, 161°, 162°, 163°, 164°, 165°, 166°, 167°, 168°, 169°, 170°, 171°, 172°, 173°, 174°, 175°.

4. Blowing nozzle according to claim 3, wherein a transition region belonging neither to the first longitudinal region nor to the second longitudinal region is formed between the first longitudinal region and the second longitudinal region, in which transition region the upper face of the nozzle box extends in parallel with the lower face of the nozzle box.

5. Blowing nozzle according to claim 1, wherein the first longitudinal region has a length which is greater than 55%, 60%, 65%, 70%, 75% or 80% of the total length of the nozzle box and/or of the length of the exhaust opening arrangement formed in the lower face in the nozzle box and/or less than 95%, 90%, 85%, 80%, 75%, 70%, 65% or 60% of the total length of the nozzle box and/or of the length of the exhaust opening arrangement formed in the lower face in the nozzle box.

6. Blowing nozzle according to claim 1, wherein the second longitudinal region has a length which is greater than 5%, 10%, 15%, 20%, 25%, 30%, 35% or 40% of the total length of the nozzle box and/or of the length of the exhaust opening arrangement formed in the lower face in the nozzle box and/or less than 90%, 85%, 80%, 75%, 70%, 65% or less than 60% of the total length of the nozzle box and/or of the length of the exhaust opening arrangement formed in the lower face in the nozzle box.

7. Blowing nozzle according to claim 1, wherein the height of the nozzle box in the region of the inflow side is greater than the height on the closure side of the nozzle box opposite the inflow side, and in that the height on the closure side is greater than the height of the nozzle box in the deflection point or turning region or turning edge or transition region thereof.

8. Blowing nozzle according to claim 1, wherein the height on the closure side of the nozzle box has a size that is less than 90%, 95%, 80%, 75%, 70%, 65%, 60%, 55%, 50%, 45% or less than 40% of the input-side size H1 and/or is greater than 20%, 25%, 30%, 35%, 40%, 45%, 50%, 55%, 60%, 65% or greater than 70% of the input-side height H1 of the nozzle box.

9. Blowing nozzle according to claim 1, wherein the height of the nozzle box at the turning point and/or in a transition region formed between the first and second longitudinal region is at least 5%, 10%, 15%, 20%, 25%, 30%, 35%, 40%, 45%, 50%, 55%, 60%, 65% or 70% less than the height on the closure side of the nozzle box and/or is greater than 10%, greater than 15%, 20%, 25%, 30%, 35%, 40%, 45%, 50% or 55%, 60% greater than the height on the closure side of the nozzle box.

10. Blowing nozzle according to claim 1, wherein the exhaust opening arrangement in the lower face comprises
   a continuous slot arrangement and/or
   a plurality of individual elongate holes and/or
   one or more hole fields comprising a large number of exit holes.

11. Stretching system comprising a blowing nozzle claim 1, wherein the blowing nozzle is arranged transversely or perpendicularly to the withdrawal direction of a material web at a distance above and/or below the moving material web, the length of the nozzle box corresponding at least to the width of the material web.

12. Blowing nozzle according to claim 1, wherein the exhaust opening arrangement comprises holes, slots and/or hole fields which have a constant geometry and/or different shapes and/or have the size of the nozzle outlet openings over the length of the nozzle box.

13. Blowing nozzle according to claim 1, wherein the exhaust opening arrangement comprises holes and/or slots and/or hole fields which have different geometries and/or different shapes and/or different diameters or sizes at least in portions along the length of the nozzle box.

* * * * *